United States Patent
Magaldi

(10) Patent No.: US 7,055,674 B2
(45) Date of Patent: Jun. 6, 2006

(54) SELF-CLEANING ENCLOSED BELT CONVEYOR FOR LOOSE MATERIALS

(75) Inventor: Mario Magaldi, Salerno (IT)

(73) Assignee: Magaldi Industrie S.R.L., Salerno (IT)

( * ) Notice: Subject to any disclaimer, the term of this patent is extended or adjusted under 35 U.S.C. 154(b) by 0 days.

(21) Appl. No.: 10/484,332

(22) PCT Filed: Jul. 22, 2002

(86) PCT No.: PCT/EP02/08196

§ 371 (c)(1),
(2), (4) Date: Sep. 20, 2004

(87) PCT Pub. No.: WO03/013991

PCT Pub. Date: Feb. 20, 2003

(65) Prior Publication Data

US 2005/0040014 A1    Feb. 24, 2005

(30) Foreign Application Priority Data

Jul. 24, 2001    (IT)    .......................... MI2001A1582

(51) Int. Cl.
*B65G 45/24*    (2006.01)

(52) U.S. Cl. ...................... 198/494; 198/493; 198/498

(58) Field of Classification Search ................ 198/493, 198/494, 497, 498
See application file for complete search history.

(56) References Cited

U.S. PATENT DOCUMENTS

| | | | | | |
|---|---|---|---|---|---|
| 719,178 | A | * | 1/1903 | Blum | 198/494 |
| 1,489,290 | A | * | 4/1924 | Walther | 198/498 |
| 1,864,359 | A | * | 6/1932 | Laughlin et al. | 198/494 |
| 2,342,038 | A | * | 2/1944 | Davis | 198/498 |
| 3,788,461 | A | * | 1/1974 | Friesen | 198/848 |
| 3,819,072 | A | * | 6/1974 | Reed | 198/494 |
| 4,230,222 | A | * | 10/1980 | Clark | 198/494 |
| 4,344,524 | A | * | 8/1982 | Falck et al. | 198/494 |

\* cited by examiner

*Primary Examiner*—James R. Bidwell
(74) *Attorney, Agent, or Firm*—Olson & Hierl, Ltd.

(57) ABSTRACT

The self-cleaning enclosed belt conveyor for loose materials comprises a mobile belt (10) operatively connected to proper containment walls (2), where mechanical means (1, 15) are provided for, connected to said conveyor belt (10), wherein said mechanical means perform together with a bottom (8) of said containment walls (2) a recovery operation of the loose materials present in the area between the belt (10), the bottom (8) and said containment walls (2), bringing the materials back either to belt's upper stretch or to adequate containment systems.

2 Claims, 3 Drawing Sheets

SELF-CLEANING ENCLOSED BELT CONVEYOR FOR LOOSE MATERIALS

FIELD OF INVENTION

The present invention is about a self-cleaning steel belt conveyor for loose materials.

BACKGROUND OF INVENTION

The steel belt conveyors, made of a metal net traction belt, armored by partially overlapping plates so as to form a conveying trough, are generally used for the transport of materials that can be particularly hot or aggressive due to their physical or chemical characteristics.

For example, in the disposal or treatment plants of hot ashes, produced by different combustion processes, it is necessary to move said ashes cooling them for subsequent uses, avoiding their dispersion in the environment. In the present state of the art, in these circumstances, double mechanical conveyors are thus created, comprising a main belt for the ashes' transport and a secondary mechanical conveyor placed below the main belt for collecting the materials that might fall out from the first one.

The primary object of the secondary mechanical conveyor is that of avoiding the formation of material lumps that could cause some irregularities to the normal operation of the conveyor.

The previously described mechanical conveyors, even if they solve the technical problem illustrated above, have however some inconveniences.

The double conveyors known to the state of the art are made in a cumbersome and complex fashion from a structural point of view, their construction is thus more expensive than that of a single belt conveyor not only for their making but for their operation as well, furthermore because of their cumbersome form it is not often possible to employ them due to the lack of sufficient space.

The double conveyor transporting system requires the use of two different control units, hence greater energy consumption with respect to the use of a single conveyor.

The following patents illustrate prior art systems:

U.S. Pat. No. 5,660,283 illustrates an opened belt conveyor comprising a rubber belt having several cleats integral with said rubber belt, and thus not able to rotate, having the main function of conveying the material.

U.S. Pat. No. 5,947,261 discloses a drag conveyor system comprising several plastic paddles which provide for conveying the material in the lower section of said conveyor system only. The "self-cleaning" action is not mechanically performed, but it is merely obtained by inclined side walls.

U.S. Pat. No. 5,199,549 illustrates a scraper conveyor intended for conveying loose bulk material away through an opening placed at one end region of said scraper conveyor.

The present invention's object is that of remedying the inconveniences belonging to the earlier state of the art.

Therefore the invention's object is a self-cleaning enclosed belt conveyor for loose materials which is reliable ad safe in its use and above all particularly efficient in moving any kind of loose materials, even very dusty ones, without discharging any material outside.

BRIEF SUMMARY OF THE INVENTION

This invention of the self-cleaning belt conveyor for loose materials consists of a mobile belt operatively connected to proper containment walls; mechanical means are housed on the belt, which perform together with the bottom of said containment walls a recovery operation of the loose materials that lay down in the area between the belt and the conveyor's bottom, bringing the materials back to said belt or towards collection means.

In the following description the operation and the variation to the invention's self-cleaning belts are explained, with reference to the annexed drawings wherein some preferred embodiments are shown in an explanatory but not limiting way.

DESCRIPTION OF PREFERRED EMBODIMENTS

Figure 2:
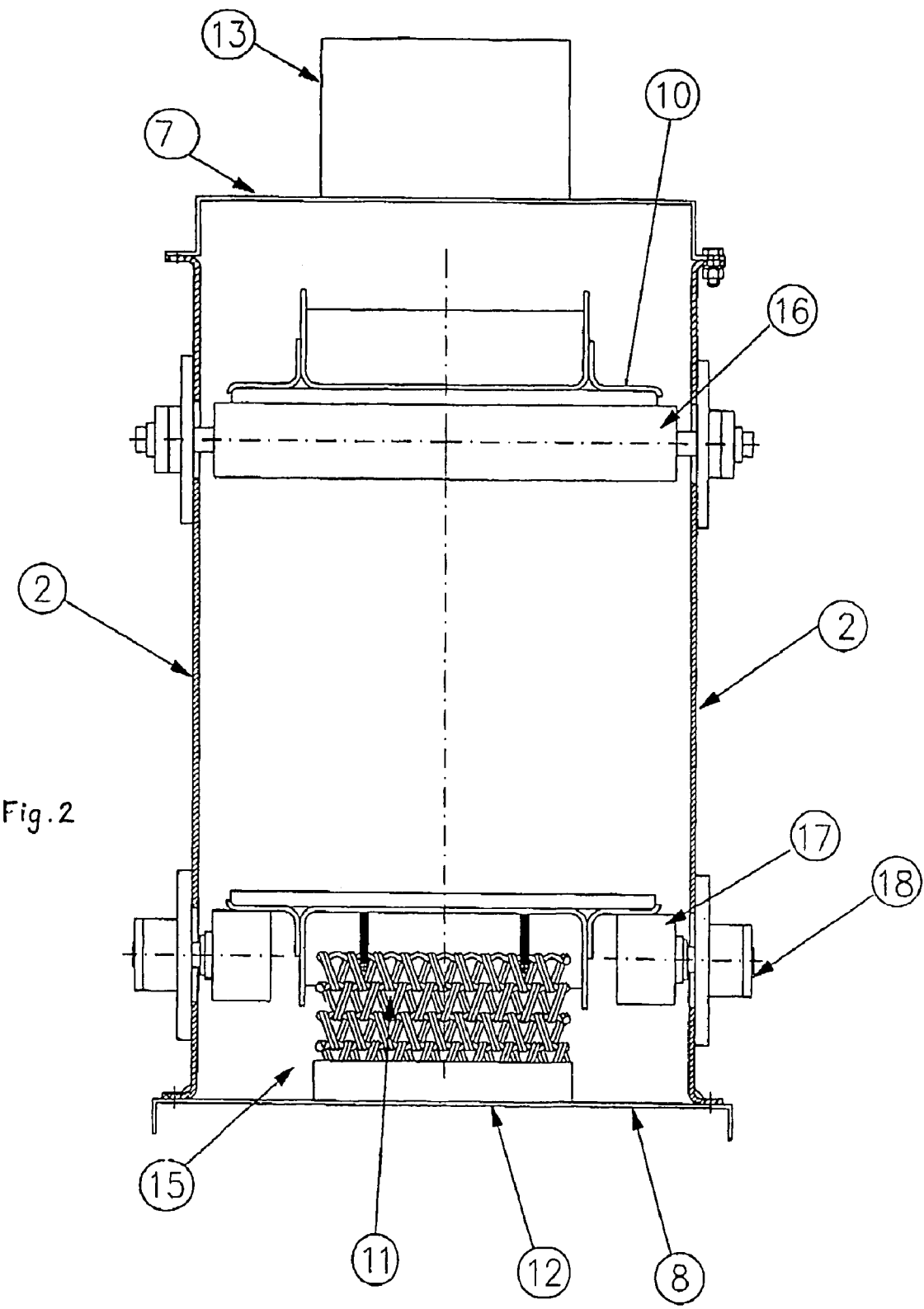
FIG. 2 is a vertical section of said belt conveyor which shows a different embodiment of the element that cleans the conveyor's lower part.

The belt conveyor has a set of containment walls comprising side walls (2), a cover (7) and a bottom (8), which enclose entirely said belt (10) except for the materials loading and unloading zones (FIG. 2).

Figure 1:
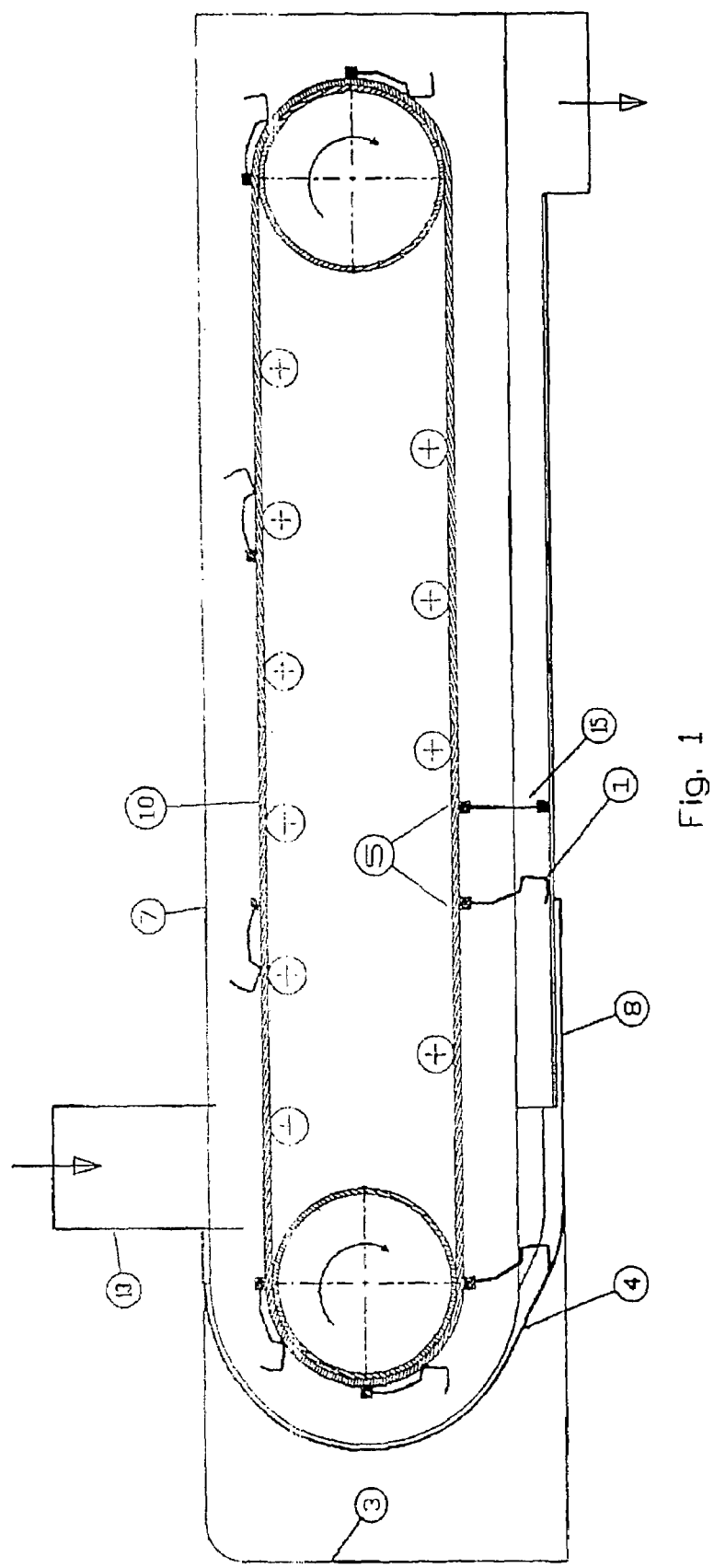
FIG. 1 is a side view of the self-cleaning belt conveyor for loose materials that provides for the joint work of the scraping elements (1, 15) for the transport.
Figure 3:
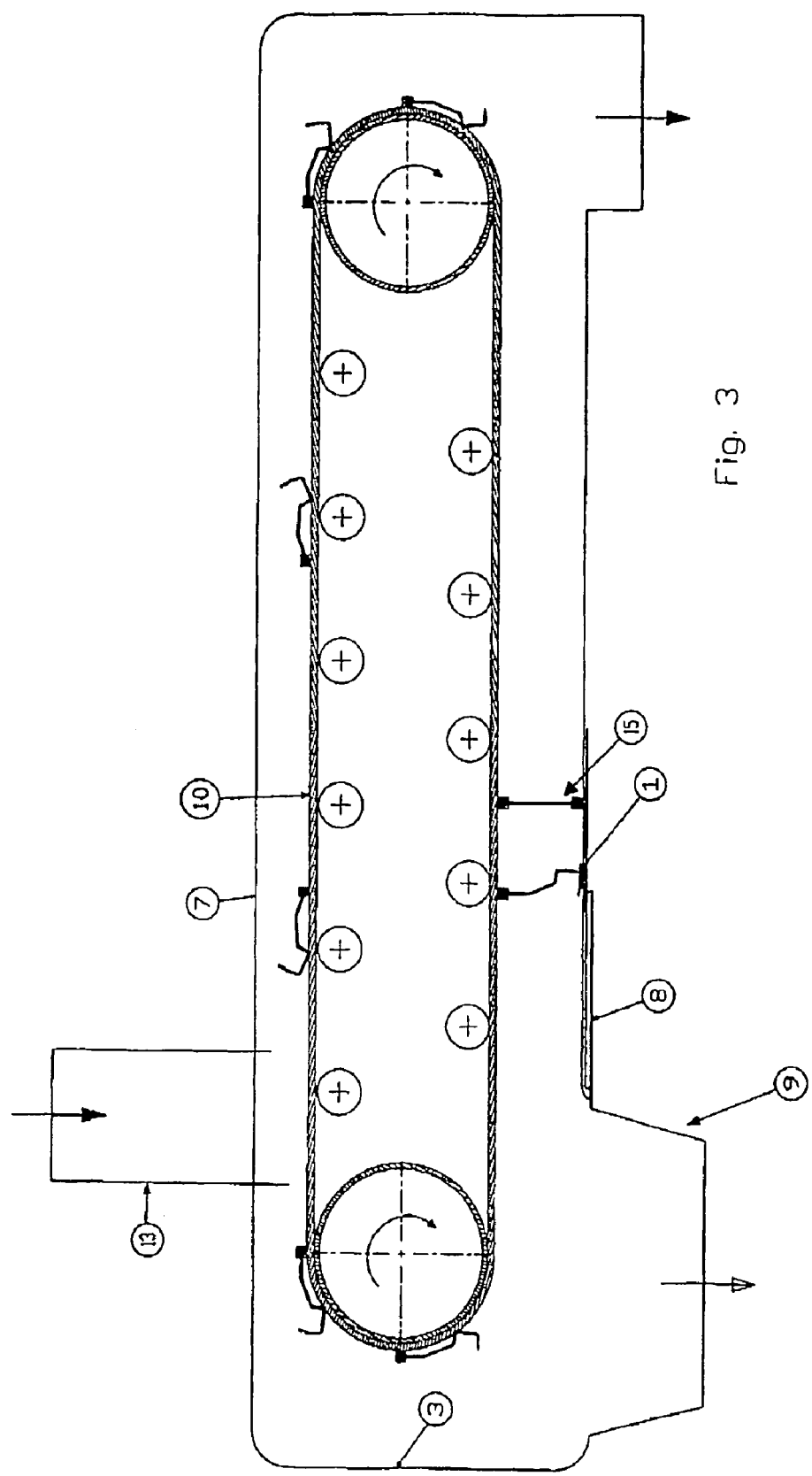
FIG. 3 is a side view of the self-cleaning belt conveyor that provides for the use of both scraping elements but with a different collection means other than the belt.

In the area herein after referred to as back section (3) (FIG. 1) there is a containment portion (4) fit to force the loose materials fell on the bottom (8) to be collected or pushed forward through mechanical means (1, 15) illustrated later on, or to be brought back to the belt conveyor (10) or else to be conveyed towards collection means (9) (FIG. 3).

More precisely, in a first lay-out said mechanical means are connected by hinges (5) to the conveyor belt (10) and include one or more scraping elements (1) arranged at regular intervals. They are made of a steel plate having an end (6) with a contour fit to push and collect the loose materials. In this way, because of the relative position where the scraping elements (1) and the bottom (8) are found when they are located on the lower side of the belt (10), that is along the return stretch, they are conveying and collecting all the loose materials that may be present on said bottom (8).

A second embodiment of the scraping elements is illustrated in FIG. 2. Said scraping elements (15) (Comprise a flexible connection element consisting of a section of metal net (11), or another equivalent mechanical element, connected at one end to the belt (10) and at the other end to a hanging mass (12) usually made of a steel solid piece or by another wear resistant matter, of parallelepipedal shape.

Said mass (12) has the function of keeping in tension the flexible element (11) during the motion of the belt (10) in the return stretch that is when it is near the bottom (8), in order to obtain the effect of pushing the loose material possibly collected at the bottom toward the back section (3).

In special cases, when the belts (10) must perform a long or slanted run, the scraping elements (1, 15); assembled on the belt (10) as usual, can push what has been laid down during the return run of the belt (10) either towards the containment area (4) or towards the recovery containers (9). From the recovery container the material can be periodically picked up manually or also through mechanical or pneumatic discharge systems. In the long runs there can be more collection points, relative to the amount of loose material laid down the bottom.

In any case, regardless of the embodiment of the scraping elements (1, 15), the operation of the self-cleaning belt conveyor for loose materials occurs in the following manner.

The conveyor belt (10) is operated by an external control unit through the traction drum; the belt (10) is supported by upper internal rollers (16) and lower rollers (17) assembled on rest: (18) equipped with external bearings or bushings. At the loading zone (13) the loose materials get loaded.

During the run on the conveyor belt, part of the material lays down on the bottom (8) of the belt conveyor, in such case the scraping elements (1, 15) which at that moment will be on the return stretch of the belt (10), due to gravity they will have their own end near to the bottom (8) pushing and collecting the material. Close to the back section (3), if referring to the lay-out without the collection means (9) (FIG. 1), the scraping element (1) that is on the return side of the belt (10) will collect the loose material held back by the tilted portion (4).

Therefore, once it is on the upper side, the scraping element (1) will unload what had been previously collected adding it to what it is coming along the loading zone (13) and it will lean, always due to gravity, on the belt (10) starting another cycle again.

The scraping elements (15), consisting of a section of metal net (11) and a hanging mass (12) usually made of a parallelepipedal shaped steel solid piece are able to convey the material laid down the bottom (8) in an unloading device placed in the back section of the belt. In this case the scraping elements (15) can be used together with the scraping elements (1) joint working in the material transport toward the unloading devices.

It is clear from the previous description that the self-cleaning belt conveyor for loose materials according to the invention allows the use of single belts for the transport of various loose materials, reducing the installation and operation costs, and also allowing the use of said belts on any kind of pattern.

Obviously, several modifications, additions, adjustments, variations and/or substitutions could be made to the embodiments previously described in an explanatory but not limiting way, without failing out of the scope of protection as also recited in the following appended claims.

The invention claimed is:

1. A self-cleaning enclosed belt conveyor for loose materials comprising a steel conveyor belt (10) operatively connected to containment walls (2), characterized by mechanical means comprising one or more scraping elements (1, 15), hinged upon said belt (10) and comprising a plate shaped into a contour fit to push and/or collect the loose materials present on the bottom, and operatively connected to said conveyor belt (10), said scraping elements (1, 15), when located on the lower side of the belt (10) and because of the relative position where they are found, perform together with a bottom (8) of said containment walls (2) a recovery operation of the loose materials present between the belt (10) and the bottom (8) of said containment walls (2) to bring the loose materials back to said belt (10) or towards a collection means (9) for said materials, and further characterized in that said scraping element (15) is flexibly connected to said belt (10) by metal net (11) which is connected at one end to the belt (10) and at the other end to a hanging mass (12), said hanging mass (12) keeping in tension said metal net (11) when it is near the bottom (8) in order to push the loose material present at the bottom (8).

2. A self-cleaning enclosed belt conveyor for loose materials comprising a steel conveyor belt (10) operatively connected to containment walls (2), characterized by mechanical means comprising one or more scraping elements (1, 15), hinged upon said belt (10) and comprising a plate shaped into a contour fit to push and/or collect the loose materials present on the bottom, and operatively connected to said conveyor belt (10), said scraping elements (1, 15), when located on the lower side of the belt (10) and because of the relative position where they are found, perform together with a bottom (8) of said containment walls (2) a recovery operation of the loose materials present between the belt (10) and the bottom (8) of said containment walls (2) to bring the loose materials back to said belt (10) or towards a collection means (9) for said materials, and further characterized in that said walls (2) comprise near a back section of said belt (10) a tilted portion (4) which together with said scraping elements (1, 15) allows the said scraping elements to hold back all the materials collected up to that point, thus allowing disposition of the collected materials on the bearing side of said belt (10) or in said collection means (9).

* * * * *